United States Patent [19]

White

[11] Patent Number: 5,055,205

[45] Date of Patent: Oct. 8, 1991

[54] PRESSURIZED CONTINUOUS OPERATING ROTARY DRUM FILTER AND METHOD

[75] Inventor: Harold R. White, New Lenox, Ill.

[73] Assignee: Alar Engineering Corporation, Mokena, Ill.

[21] Appl. No.: 356,124

[22] Filed: May 24, 1989

[51] Int. Cl.$^5$ ............................................. B01D 33/06
[52] U.S. Cl. ..................... 210/784; 210/236; 210/241; 210/396; 210/398; 210/402; 210/808
[58] Field of Search ............... 210/236, 241, 193, 396, 210/398, 402, 770, 784, 808

[56] References Cited

U.S. PATENT DOCUMENTS

| | | | |
|---|---|---|---|
| 1,288,433 | 12/1918 | McCaskell | 210/784 |
| 2,851,161 | 9/1958 | Dahlstrom et al. | 210/784 |
| 2,911,098 | 11/1959 | Leithiser | 210/396 |
| 2,988,224 | 6/1961 | Green | 210/402 |
| 3,705,649 | 12/1972 | Arvanitakis | 210/770 |
| 3,919,088 | 11/1975 | Doncer et al. | 210/402 |
| 3,957,636 | 5/1976 | Arvanitakis | 210/770 |
| 4,045,853 | 9/1977 | White | 29/163.5 |
| 4,083,787 | 4/1978 | White | 210/402 |
| 4,510,055 | 4/1985 | White | 210/500.1 |
| 4,510,061 | 4/1985 | White | 210/769 |
| 4,511,468 | 4/1985 | White | 210/181 |

FOREIGN PATENT DOCUMENTS

| | | | |
|---|---|---|---|
| 200069 | 5/1954 | Australia | 210/236 |
| 62-19221 | 1/1987 | Japan | 210/784 |
| 193442 | 5/1967 | U.S.S.R. | 210/241 |
| 276820 | 9/1927 | United Kingdom | 210/236 |
| 1335196 | 1/1970 | United Kingdom | 210/396 |

Primary Examiner—Robert A. Dawson
Assistant Examiner—Joseph Drodge
Attorney, Agent, or Firm—Hill, Van Santen, Steadman & Simpson

[57] ABSTRACT

This invention increases the efficiency and flow rate of rotary drum filtration and makes possible the use of such filtration for volatile and high temperature materials. According to the invention a rotary drum filter unit operates continuously in a pressure vessel and solids are intermittently discharged from the vessel. The filtered solids are scraped from the drum periphery and dropped into a trough in the vessel communicating with a discharge passageway. When the passageway is filled with solids, a shroud, driven by a reciprocating ejector traps the solids in the passageway. The ejector compacts the trapped solids forming plugs which are sequentially discharged from the pressure vessel. The filter unit is fixed to a removable end head for the pressure vessel which has a wheeled carriage riding in the vessel and the vessel in turn is carried on wheels so that when the end head is released from the vessel, the filter unit can be exposed for service such as the replacement of filter screens and cloths on the drum.

12 Claims, 6 Drawing Sheets

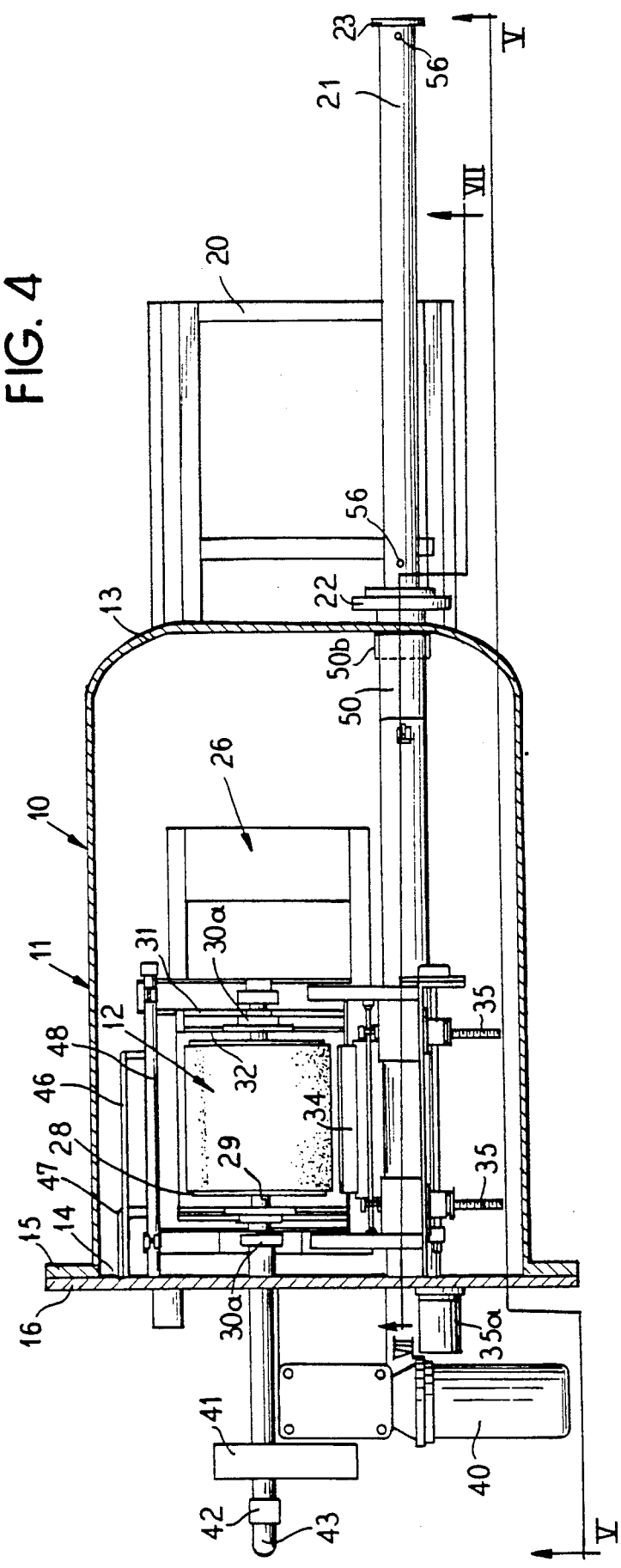

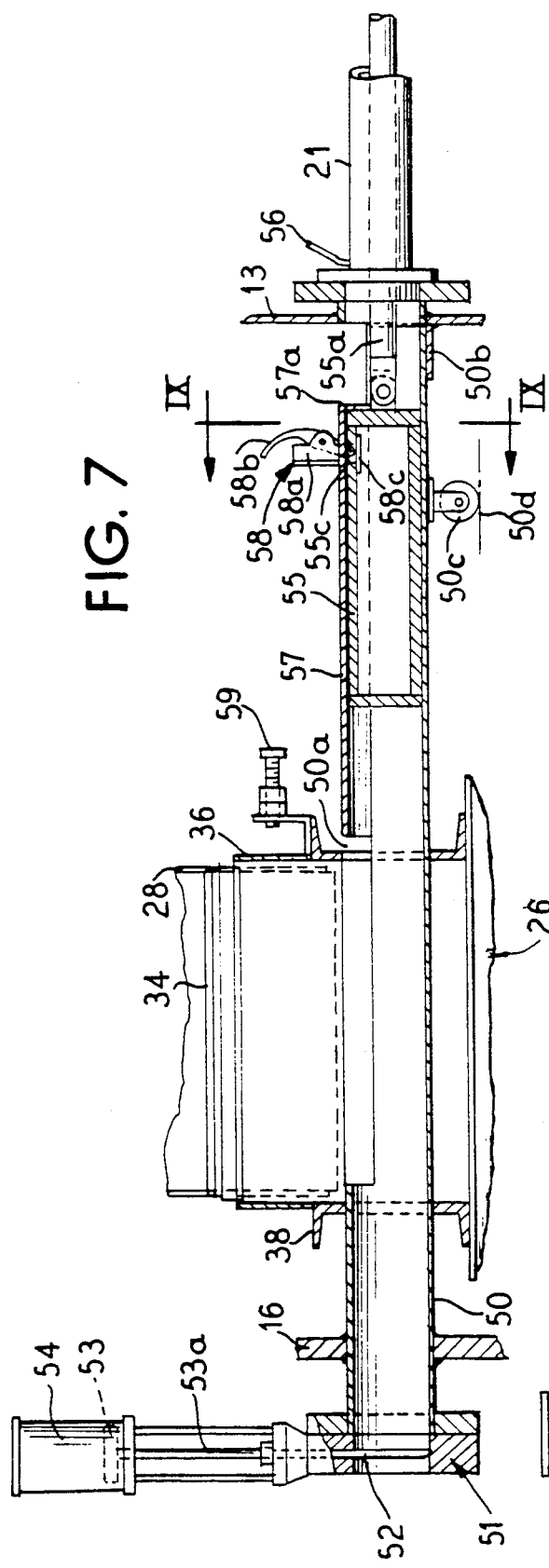
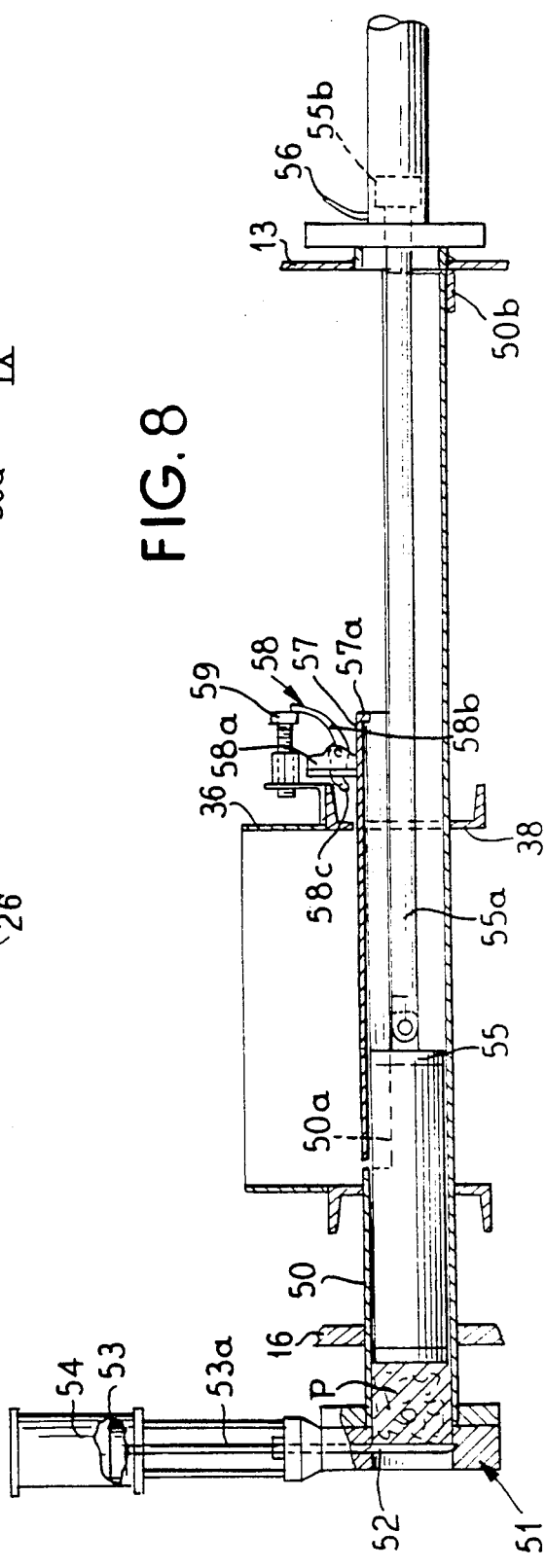

PRESSURIZED CONTINUOUS OPERATING ROTARY DRUM FILTER AND METHOD

BACKGROUND OF THE INVENTION

1. Field of the Invention

This invention relates to positive pressure filter units adapted to be continuously operated and more particularly relates to rotary drum filters capable of filtering solids from all types of liquids including volatile and high temperature material. The filter units are encased in pressure vessels to force filtrate through the drum periphery under relatively high positive pressures to collect solids from the drum periphery and to sequentially compact and eject the solids without stopping the filtration or losing pressure.

2. Description of the Prior Art

Heretofore known rotary drum filter units could only be operated with gravity or suction drainage of the filtrate thus limiting the pressure differential through the drum periphery to a small degree. Even the most efficient suction pumps could not maintain a pressure differential above about 12 PSI. Further, such units could not filter volatile or high temperature materials. On the other hand, known positive pressure actuated filter units could only be batch operated because the pressure vessel had to be frequently opened to remove the filter cake.

It would therefore be an improvement in this art to provide rotary drum pressure filtration, preferably pre-coat rotary drum pressure filtration, and it would particularly be an improvement in this art to compact the filtered solids from the rotary drum and sequentially discharge these solids in the form of plugs without slowing up the continuous positive pressure rotary drum filtration or losing pressure.

SUMMARY OF THE INVENTION

According to this invention, a pressure vessel, preferably in the form of a horizontal cylindrical tank with a removable end head, provides an air-tight chamber receiving a complete rotary drum filter unit. This unit is preferably fixed to the removable end head of the tank and is supported on a wheeled carriage riding in the bottom of the tank and carried by the end head. The tank itself is preferably mounted on a wheeled carriage so that when the end head is uncoupled, the body of the tank can be retracted to uncover the filter drum unit for service.

The filter drum unit includes a pan with a pond of liquid through which the drum rotates, a trough receiving filtered solids that are scraped from the drum periphery and a compactor and ejector assembly which sequentially traps the solids in the trough, compacts the trapped solids, and ejects them from the tank in the form of plugs.

The filtrate from the interior of the drum is forced through a hollow drum axle and a rotary coupling to an exterior conduit from which it is drained by gravity or pumped to a collector. The drum is rotated about a horizontal axis by an exterior motor preferably carried by the end head.

A compressor maintains the sealed chamber provided by the tank and the end head at an elevated pressure substantially above atmospheric, such as 25-150 PSI, to maintain a high pressure differential across the periphery of the drum thereby greatly accelerating the filtering operation and also making possible the filtering of thick viscous slurries, very hot liquids, and even volatile liquids which could not be handled by the conventional rotary drum filter units. The pressurized tank thus has an autoclave function.

In operation, the filter cloth or screen on the periphery of the rotary drum is preferably pre-coated with a filter aid material such as diatomaceous earth, charcoal, and the like to build up a relatively thick pre-coat cake covering the cloth or screen. The tank is pressured and the drum is rotated through the pond of the material to be filtered in the underlying filter pan. The material to be filtered is pumped into the pan to maintain a constant level of the pond. The pressure differential across the drum periphery forces the liquid into the drum and the solids are deposited on the surface of the pre-coat. A scraper removes these solids from the drum periphery and also shaves off a thin underlying layer of the pre-coat to present a clean filtering surface to the pond. The liquid filtrate is discharged from the drum to the tank exterior. The scraped solids drop into a trough, are compacted, and discharged from the tank in the form of plugs. The filter unit operates continuously until all of the material is filtered or the pre-coat cake is used up. When the pre-coat layer on the drum is scraped down to about ¼" thick, pressure is removed from the tank and the remaining pre-coat is washed off the drum by water from a spray tube adjacent the drum. During this spray washing of the drum, the pan is drained of old material and then filled with a new batch of pre-coat filter aid slurry, the spray wash is operated during the fillup of operation to keep the filter cloth clean. The wash water also collects in the pan. Then when the pan is filled, the spray wash is stopped, the drum picks up a new filter aid layer, the pan is next filled with the slurry to be filtered and the filtration is continued. Thus, the tank need only be opened for repair and replacement of filter cloths.

A preferred embodiment of the invention is illustrated in the attached drawings in which:

FIG. 4 is a longitudinal sectional view generally along the line IV—IV of FIG. 1 with parts in elevation.

FIG. 7 is a view generally along the line VII—VII of FIG. 4, with parts in elevation.

FIG. 8 is a view similar to FIG. 7 but showing the ejector in an advanced position.

BRIEF DESCRIPTION OF THE ILLUSTRATED PREFERRED EMBODIMENT

Figure 1:
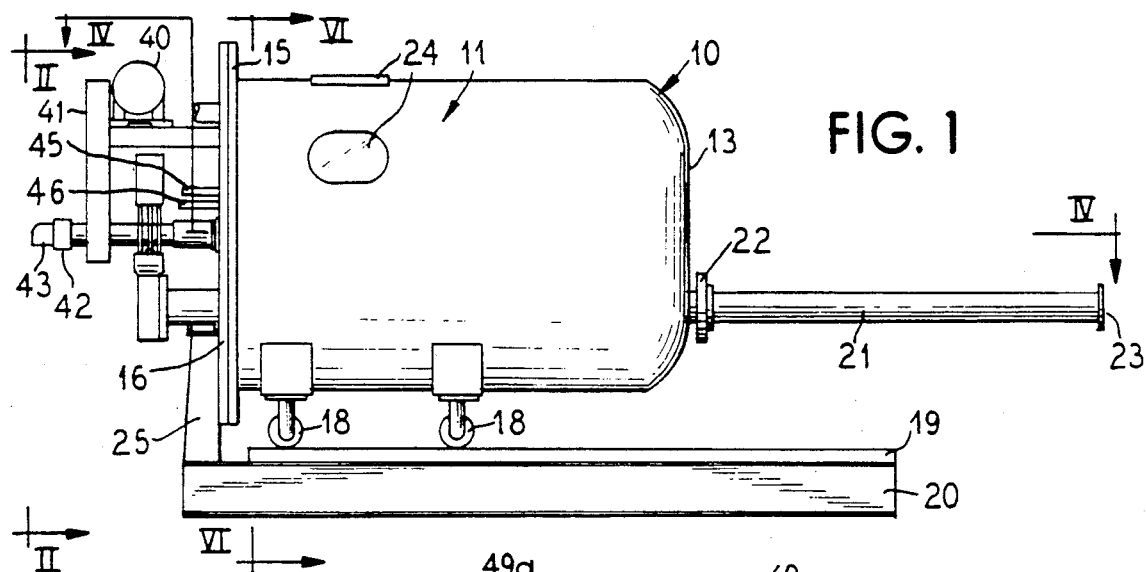
FIG. 1 is a side elevational view of the continuously operating pressurized rotary drum filter unit of this invention in its closed condition.
Figure 2:
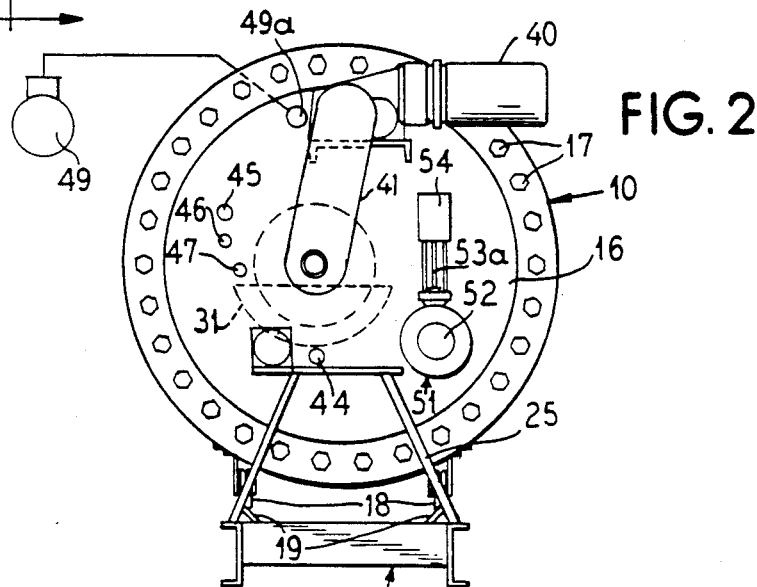
FIG. 2 is an end elevational view of the unit of FIG. 1 taken along the line II—II of FIG. 1.
Figure 3:
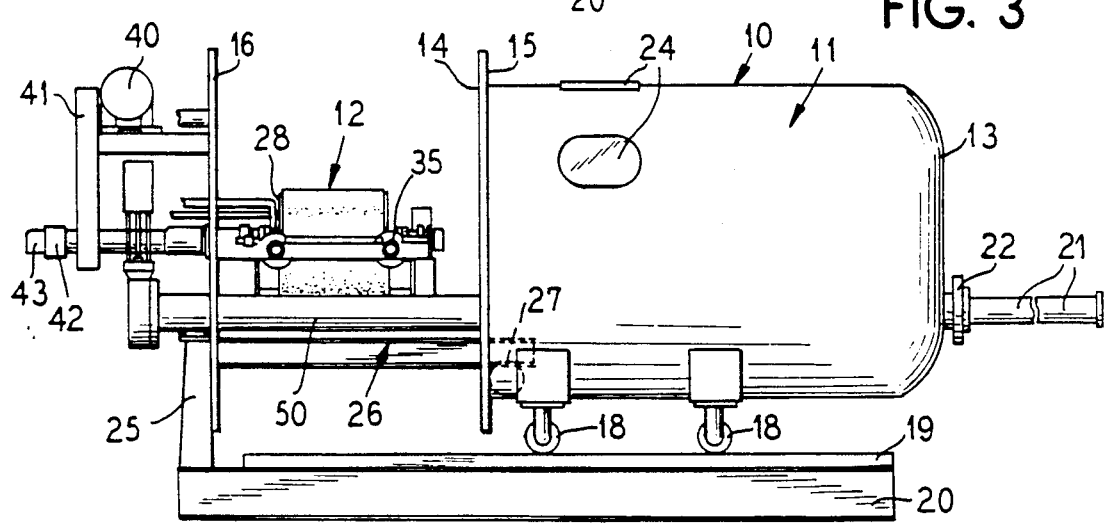
FIG. 3 is a side elevational view of FIG. 1 and 2 in its open condition.

The pressurized continuous operating rotary drum filter 10 of FIGS. 1-6 comprises generally a pressure vessel or tank 11 surrounding and enclosing a rotary drum filter unit 12.

The tank 11 is in the form of a horizontal cylinder with a closed end 13 and an open opposite end 14 having an outturned flange 15 therearound to which is affixed an end head or cover 16 by means of bolts 17 which sealingly mount the cover in airtight relation on the flange 15.

The cylindrical tank 11 is supported on wheels 18 which ride on tracks 19 carried by a base 20. As better shown in FIG. 6, the tracks 19—19 are angle beams with their pieces projecting into grooves in the wheels 18—18, so as to maintain the tank 10 on the tracks.

The closed end 13 of the tank 11 has a horizontal tube 21 attached thereto through a coupling 22 and extending rearwardly for a substantial distance to an end cap 23.

Transparent ports 24 are provided at circumferential spaced intervals around the top portion of the tank 11 to permit visual access to the interior of the tank at the vicinity of the filter drum unit 12.

The end head 16 is fixedly mounted in a vertical upright position on a pedestal 25 at the front end of the base 20.

A platform 26 is attached to the inside of the end head 16 and projects therefrom into spaced relation with the rear wall 13 of the tank when the end head closes the drum. A roller 27 suspended from this platform rides on the inner surface of the bottom of the cylindrical drum 11. The filter drum unit 12 is mounted on and spans this platform 26.

Figure 6:
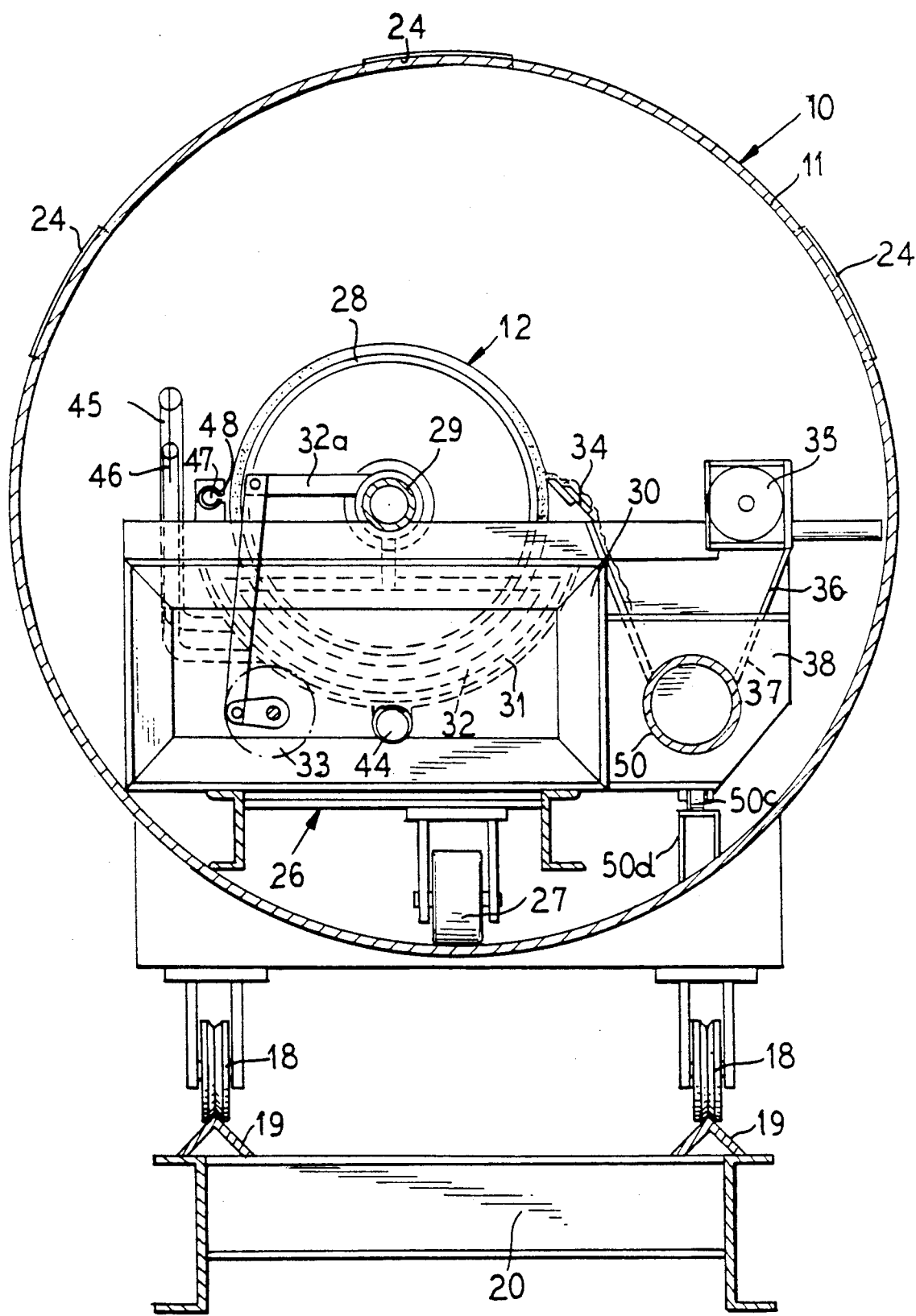
FIG. 6 is a transverse sectional view generally along the line VI—VI of FIG. 1, with parts in elevation.

The rotary drum filter unit 12 may be of the type shown in the Doncer and White U.S. Pat. No. 3,919,088 issued Nov. 11, 1975, the disclosure of which is incorporated herein by reference. Such a unit includes a horizontal rotating filter drum 28 with a horizontal axle 29 rotatably mounted in bearings 30a on framework 30 carried by the platform 26. An arcuate open top pan 31 is suspended from this framework 30 and receives the lower portion of the drum 28 therein. A rocker type agitator 32 in the pan stirs the pond of liquid therein and is suspended from the axle 29 and rocked by a linkage 32a driven by a motor 33 (FIG. 6).

The drum construction may be of the type shown in the Harold R. White U.S. Pat. No. 4,045,853 issued Sept. 6, 1977, the disclosure of which is incorporated herein by reference. The filtered solids and a film of pre-coat filter cake are scraped from the drum periphery just before it descends into the filter pan by the scraper 34 spanning the drum periphery and advanced by motor driven screw rod mechanism 35 driven by an external motor 35a carried by the end head and more particularly shown in U.S. Pat. No. 3,919,088, so that a thin film of the pre-coat cake is continuously removed with the filtered out solids on the cake presenting a clean cake surface to the pond in the pan 31.

An open top trough 36 converging to an open bottom 37 is positioned to receive the solids from the scraper 34 and can be mounted on channel beams 38.

The plumbing and motor drives for the filter drum unit 12 are carried by the end head 16. These include an electric motor 40 with an encased chain drive 41 rotating the hollow drum axle 29 to drive the drum. The hollow axle rotates in a packing mounted on the end head 16 and is joined beyond the head through rotary coupling 42 with a discharge pipe 43 through which the filtrate is removed from the interior of the drum. It will be understood that the interior of the drum 28 is drained through a hollow axle or trunnion open to the drum interior and rotatably supported in the tank 11 by bearings 30a and then extends through a seal or packing in the end head 16 to the exterior rotary coupling 42 and that the discharge pipe 43 beyond this coupling may be connected to a pump for propelling the filtrate to a sewer or collection vat.

The end head 16 also has a drain outlet pipe 44 for the bottom of the pan 31, an inlet pipe 45 for filling the pan with material to be filtered, an inlet pipe 46 for feeding filter aid slurry to the drum and an inlet pipe 47 to a spray tube 48 for depositing filter aid material on the drum to build up the initial pre-coat cake. This spray head 48 is in the form of a tube spanning the length of the drum adjacent the top thereof.

An air compressor 49 can be mounted directly on the end head 16 or remote therefrom to supply compressed air through an inlet 49a for pressurizing the interior of the tank 11.

A solids discharge tubular conduit 50 spans the length of the tank 11 and is carried by and through the end head 16. The end of this conduit adjacent the head 16 carries an external guillotine gate assembly 51 which, as shown in FIGS. 7 and 8, includes a housing slideably mounting a vertical gate 52 adapted to selectively open and close the end of the conduit 50 adjacent the head 16. This gate is operated pneumatically by a piston 53 in a cylinder 54. A connecting rod 53a joins the piston 53 and gate 52.

Figure 9:
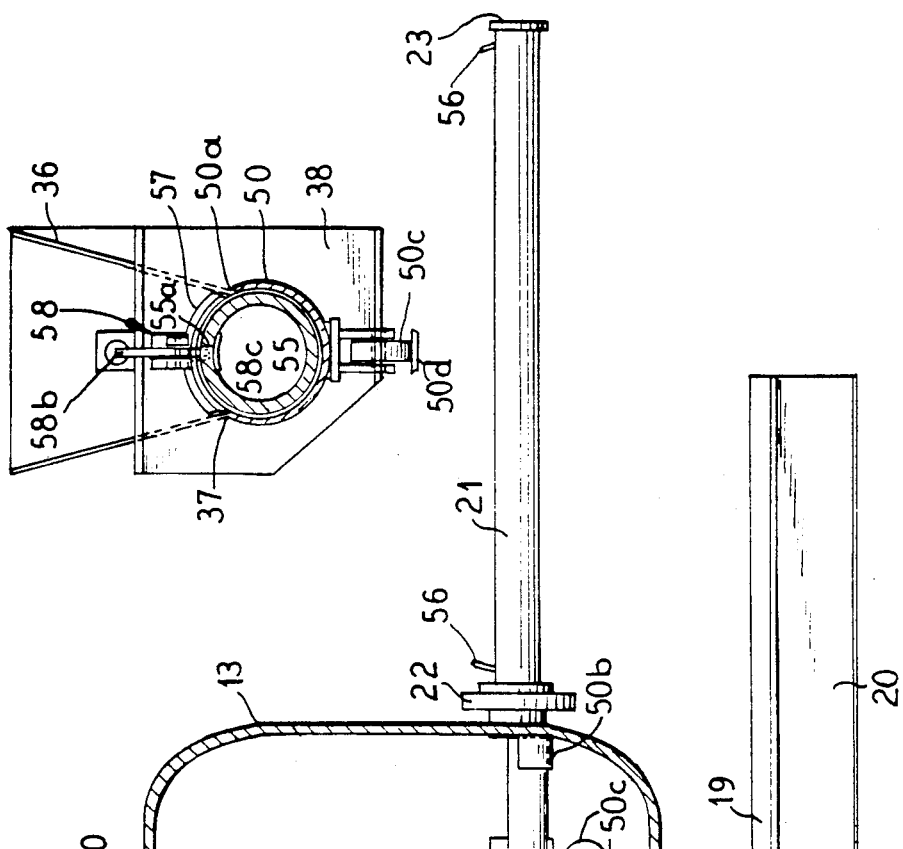
FIG. 9 is a transverse sectional view along the line IX—IX of FIG. 7.
Figure 5:
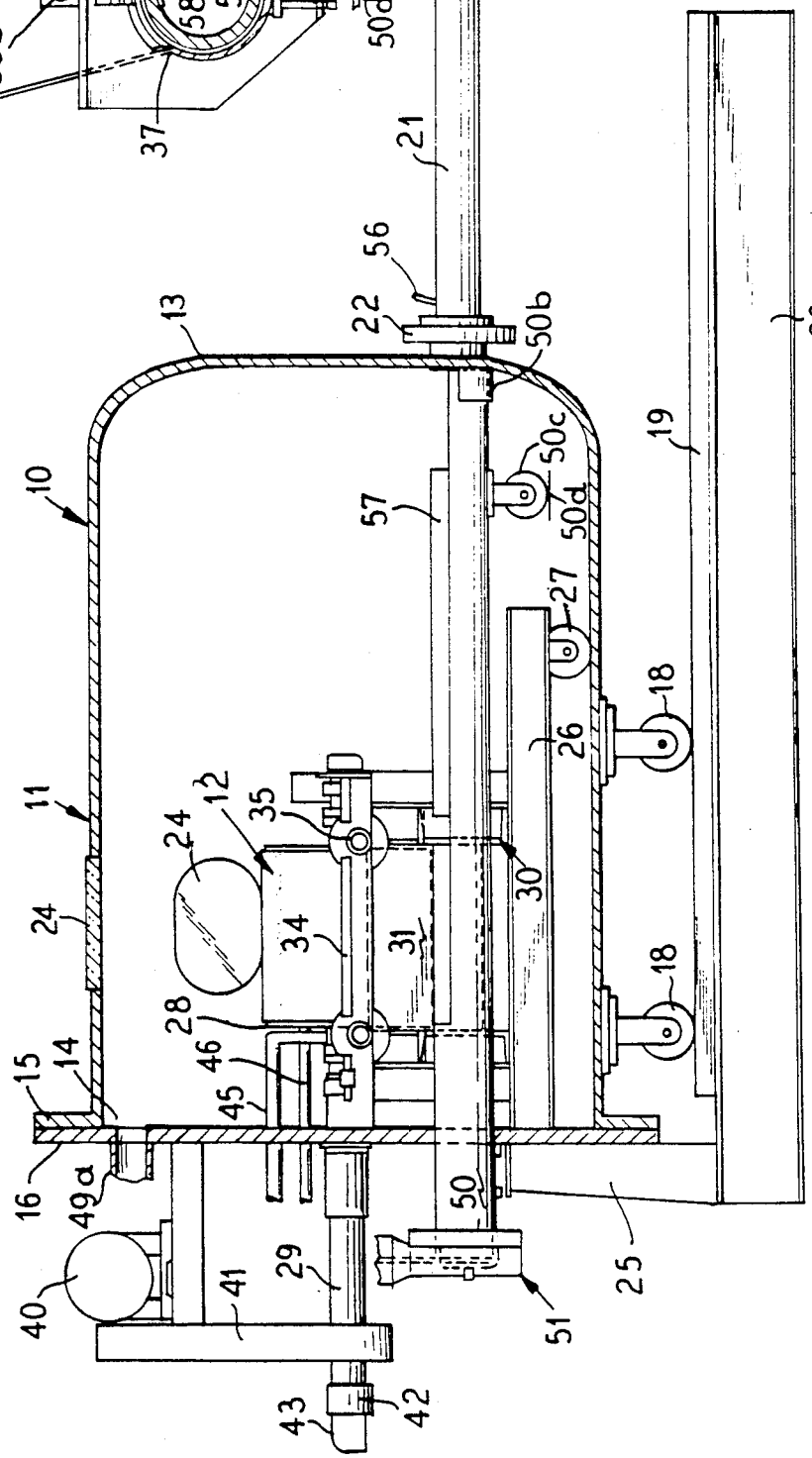
FIG. 5 is a sectional view generally along the line V—V of FIG. 4, with parts in elevation.

The tube 50 extends longitudinally through the bottom of the trough 36 (FIGS. 7, 8 and 9) and has an open top slot portion 50a communicating with the bottom of the trough 36. The end of the tube remote from the head 16 is supported on an open top bearing sleeve 50b carried by the tank end wall 13 and projecting into the tank. A roller 50c depending from the rear end portion of the tube 50 rides on a platform 50d in the tank when the tank is retracted from the end head 16 and the tube is withdrawn from the sleeve 50b.

The tube 50 slideably mounts a plunger 55 pinned at its rear end to a piston rod 55a having a piston head 55b slidable in the tube 21 which projects rearwardly from the tank end wall 13. Compressed air or hydraulic fluid flows through conduits 56 at opposite ends of the tube 21 to propel the piston 55b along the length of the tube 21 and in turn driving the piston rod 55a for reciprocating the plunger 55 in the tube 50.

A shroud 57 slides on the tube 50 to selectively close the open slot top 50a of the tube. This shroud 57 at its rear top end carries a latch 58 composed of an upstanding lug 58a secured to the top of the shroud, a handle 58b pivoted on this lug and a pin 58c on the bottom end of the handle fitting in a slot 55c in the top of the plunger 55. The handle 58b is spring biased to an upright position whereupon the pin 58c seats in the slot 55c so that the shroud 57 moves with the plunger 55. However, when the shroud reaches the end of its forward stroke, the handle 58b engages an adjustable stop 59 and is depressed to move the pin 58c out of the slot 55c thereby disengaging the shroud from the plunger. The stop 59 is mounted on the framework 38 also mounting the tube 50.

The arrangement is such that the solids drop through the open trough bottom 37, through the slot 50a into the tube 50 and when the plunger 55 is driven on its forward stroke in the tube 50, it carries the shroud 57 therewith and the leading end of the shroud projects beyond the leading end of the plunger. The shroud then slides over the tube 50 across the open bottom 37 of the trough 36 covering the slot 50a of the tube 50 and closing the bottom of the trough. The continued forward stroke of the plunger trips the latch 58 as the handle 58b engages the stop 59 and the plunger compacts the solids trapped in the tube and proceeds to push these solids through the front end of the tube against the closed gate 52 of the discharge mechanism. The solids are pressed between the closed gate 52 and front end of the plunger 55 forming a plug P (FIG. 8) from the solids. When sufficient compaction of the solids has taken place to form the tubular plug P, the gate 52 is raised and continued forward movement of the plunger 55 discharges the plug out of the tube 50.

After discharging a plug P, the plunger 55 is retracted, the gate 52 is closed, and the rear end of the plunger engages a lip 57a on the rear of the shroud 57 to retract the shroud therewith to the end wall 13 of the tank and again opening the slot 50a and bottom 37 of the trough to dump solids into the tube 50. When the spring biased handle 58b of the latch mechanism 58 is retracted from the stop 59 it will again propel the pin 58c back into the slot 53a for moving the shroud forward with the plunger on the next forward stroke.

From the above descriptions, it will be understood that all of the components of the filter drum unit 12 and the compactor and discharge mechanism for the solids are affixed to the end head 16 so that the tank 11 may be retracted on its wheels 18 away from the end head when the bolts 17 uncouple the end head from the open end of the tank. As the tank is retracted from the end head, the roller 27 on the support carriage for the drum unit 12 will ride on the bottom of the tank and the roller 50c will ride on the platform 50d as the tube 50 slides off of its bearing support 50b. While the tube 21 is carried by the rear wall 13 of the tank 11, the piston and piston rod in this tube are merely pulled forwardly in the tube to accommodate the spacing of the end head 16 from the open end of the tank.

Figure 10:
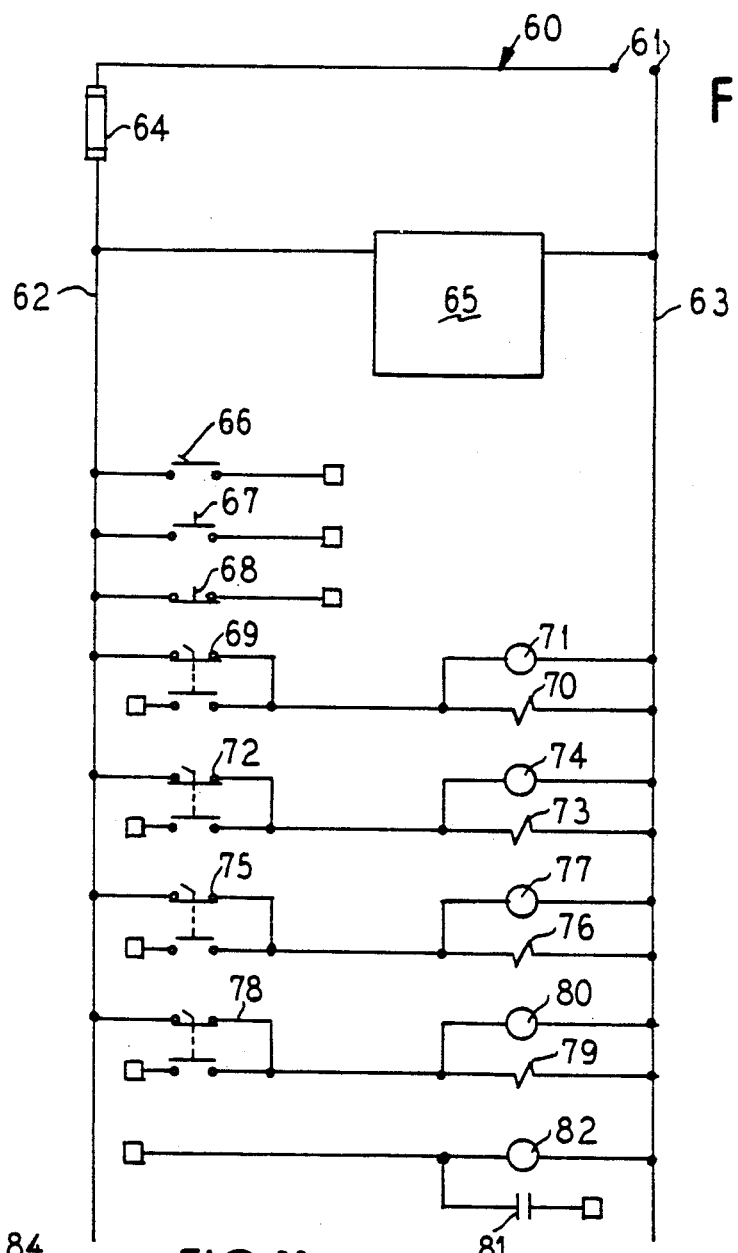
FIG. 10 is an electrical diagram showing switches and relays for sequentially operating the components of the unit as controlled by a computer.
Figure 11:
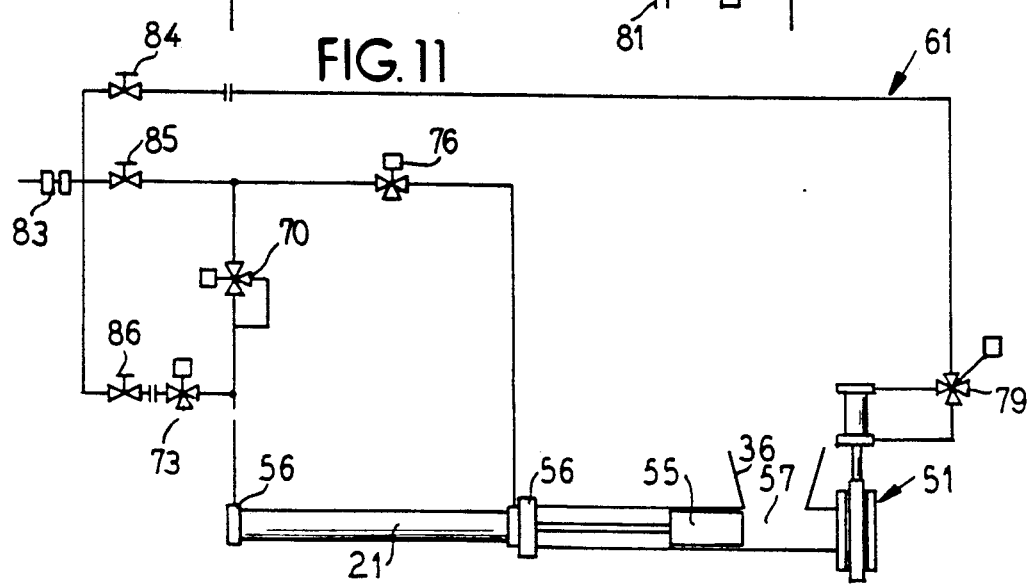
FIG. 11 is a diagram of a circuit for operating pneumatic or hydraulic components of the unit.

The electrical circuit 60 of FIG. 10 and the pneumatic diagram 61 of FIGS. 10 and 11 illustrate the automatic control of the components of the apparatus 10 to operate in proper sequence and provide a fully automated process.

In FIG. 10, the electric circuit 60 is energized from a power source 61 energizing power lines 62 and 63. A circuit breaker 64 protects the electrically energized components. A computer 65 is programmed to sequence the operation. Three manually controlled push button switches 66, 67 and 68 determine the operation of the components. The switch 66 places the system in an automatic mode, the switch 67 starts the cycle of operation and the switch 68 stops the cycle.

A relay 69 controls the solenoid valve 70 for moving plunger 55 forward to push the shroud and solids toward the gate 5, and this operation is illuminated by a light 71.

A relay 72 controls the solenoid valve 73 for driving the plunger at a greater force through its compacting stroke after the shroud is closed to form the plug P and maintain a desired thrust on the trapped plug P between the gate 52 and the plunger 55. This operation is also indicated by a light 74.

A relay 75 controls the solenoid valve 76 controlling the retraction of the plunger and this operation is also illuminated by a light 77.

A relay 78 controls solenoid 79 which drives the gate valve. This operation is also illuminated at 80.

A timer 81 is determines operating duration of each cycle and shows the progress at 82.

The pneumatic diagram 61 of FIG. 11 shows the solenoid valve 79 controlling the gate assembly 51, the valve 76 for retracting the plunger 55, the valve 70 for driving the plunger forward to carry the shroud 57 into position for closing the bottom of the trough 36 and the valve 73 for driving the plunger 53 through its compacting stroke.

Air pressure from a plant air source 83 is supplied to valves 84, 85 and 86. The valve 86 is set to a desired high pressure such as 100 PSIG. This high pressure is then fed to the solenoid valve 73 for controlling the compacting stroke. The valves 84 and 85 are set to lower pressures.

When the selector switch 66 is placed in the automatic position, the plunger 55 will retract to its starting position and the gate valve 52 will close. When the start cycle button 67 is closed the automatic sequence is then started. In this automatic sequence, the cycle timer 81 is energized and during this time the solids are collected in the trough portion 36 and dropped into the tube 50. Then when the preset time of the cycle timer 81 expires, the pushing of the solids and the closing of the shroud begins at a low pressure of, say, 50 PSIG. The solenoid valve 73 is then energized applying 100 PSIG of compressed air to the piston 55b thereby moving the plunger 53 and shroud forwardly and compressing the trapped solids to form the plug P. During this operation the compaction chamber in the tube 50 is sealed so that additional solids from the trough do not enter. Then the solenoid 73 is deenergized releasing pressure on the compacted solids and solenoid valve 79 is energized to raise the gate 52. When the gate is opened the solenoid 70 is energized to apply 50 PSIG air to the piston 55b to move the plunger head forward and push the compacted plug P out of the tube 50.

Once the solids are removed, solenoid valve 70 is deenergized and solenoid valve 76 applies 50 PSIG air to the front end of the piston 55 moving the plunger 53 and the shroud on the retraction stroke to again open the bottom of the trough for receiving more uncompacted solids. The solenoid valve 79 is deenergized again closing the gate 52. The compactor will then begin another compaction cycle when the cycle timer interval has been timed out.

The unit will run continuously through the cycle until the stop push button 68 is depressed or the button switch 66 is placed in a "hand" position. The compactor cycle can be adjusted to handle varying volumes of uncompressed solids by changing the cycle timer thereby varying the amount of time between compaction cycles.

PREFERRED SEQUENCE OF OPERATION

1. Prior to the start of a series of filtration cycles, the filter operator opens the tank and installs a filter cloth or screen on the drum of the unit 12. The cloth can be fastened to the drum by double backed adhesive tape or by metal or plastic straps.

2. The tank is rolled back against the end head and bolted thereto thus sealing the filter unit in the tank.

3. A filter aid slurry composed of water and filtrate materials such as diatomaceous earth, powdered charcoal, cellulose fibrous material and the like is prepared in an external tank equipped with an agitator and pump. The precoat slurry is pumped into the filter pan 32 of the filter unit 12.

4. The drum 29 of the filter unit 12 is rotated through the pond of slurry in the pan 31 and the agitator 32 is rocked. The tank is pressured to force the liquid of the precoat slurry into the drum.

5. The pre-coat operation continues until all of the filter aid material is deposited on the drum or until a filter cake of sufficient thickness surrounds the drum.

6. The material to be filtered is pumped into the filter pan 32 and the compressor is operated to develop the desired pressure in the tank 11 to force the filtrate through the pre-coat filter aid cake and filter cloth into the interior of the drum. The solids are retained on the surface of the filter aid cake and are dried by the passage of the pressured air through the filter cake.

The motor 35 driving the scraper 34 is actuated to advance the scraper knife edge at about 0.004 inches per revolution of the drum thereby removing the solids deposited on the pre-coat filter cake and thin film of the cake to provide a fresh clean filter cake surface entering the filter pan to receive the material being filtered.

7. Filtration is continued until all of the slurry of the material is filtered or until all of the filter aid cake is consumed.

The filtered and dried solids scraped from the drum periphery drop into the trough 36 and through the open slot 50a into the tube 50.

8. When the slotted portion of the tube is substantially filled with solids, the compactor and ejector mechanism is actuated by the piston 55b to push the plunger 55 and shroud 57 forwardly to trap the solids in the tube and to then compact the solids into a plug. The compacted plug is then ejected from the tank. The piston 55b then withdraws the plunger 53 and shroud 57 from under the trough 36 so that the next batch of solids is deposited in the tube 50.

9. The filtrate and air forced through the filter cake and periphery of the drum are discharged through the hollow axle shaft of the drum into a discharge pipe connected to the axle shaft by means of a rotary joint. A pump can be provided to flow the filtrate to a desired collection station.

10. At the end of the filtration cycle, air pressure is vented from the tank, the spray header 48 is actuated to wash the drum and the liquid and filter aid is collected in the pan 32 underlying the drum. Fresh filter aid slurry is also fed to the pan.

11. When a high level is sensed in the filter pan 32, the spray header 48 is turned off and compressed air is introduced into the tank 11 to develop a high pressure in the tank around the drum. This pressure forces the filter aid on the drum forming a pre-coat cake.

12. If the filter unit 10 must be serviced, the end head 16 is unbolted from the tank 11, and the drum retracted away from the end head to expose the filter unit for service, such as replacement of filter cloth, etc.

From the above descriptions it will be understood that the device 10 of this invention operates continuously through a plurality of cycles which are timed to suit conditions and the high pressure differential across the drum periphery not only greatly speeds up the filtering operation but the pressure developed in the tank provides an autoclave effect which will handle volatile materials and materials at high temperatures which could not be handled by known filter drum units.

I claim as my invention:

1. A positive pressure rotary drum filter which comprises a housing adapted to be closed to form an airtight chamber, a rotary drum filter unit in said chamber, said unit including a rotary filter drum with an air and liquid pervious periphery, means for supplying material to be filtered to the periphery of the drum, means for removing solids from the drum periphery, means for draining filtrate from the drum interior, means for collecting removed solids from the drum periphery, means for pressurizing the chamber to maintain a high pressure differential across the periphery of the drum, a discharge passageway positioned below said means for collecting removed solids from the drum periphery to receive the solids therefrom, said passageway having means to trap the solids received therein, said passageway having an open discharge end, a sealing gate at said discharge end of the passageway, means for selectively opening and closing said gate a plunger slidable in said passageway, means for reciprocating said plunger in said passageway from a retracted position behind solids trapped in the passageway to an advanced position first compressing the trapped solids in the passageway against the gate in the closed position of the gate to form the solids into a plug and to then further advance in the passageway to eject the plug through the discharge end of the passageway when the gate is open, and said plunger preventing leakage of pressure from the chamber when the gate is opened.

2. A positive pressure continuous operating rotary drum filter which comprises a housing adapted to be closed to form an airtight chamber, a rotary drum filter unit in said chamber including a horizontal rotary filter drum with a filtering periphery, an open top pan under said drum, means for maintaining a pond of liquid to be filtered in said pan at a level receiving a substantial portion of the periphery of the drum in the pond, a scraper removing filtered solids from the drum periphery above that portion of the periphery immersed in the pond, a trough receiving solids from the scraper, a discharge passageway positioned to receive solids from the bottom of said trough and having an open discharge end, means for trapping solids in the passageway, a sealing gate at said discharge end of the passageway, means for opening and closing said gate, means for maintaining said airtight chamber at a positive pressure substantially above atmospheric pressure to maintain a high pressure differential across the periphery of the drum, means for draining filtrate from the interior of the drum out of the airtight chamber, and reciprocating means in said passageway sequentially compacting the trapped solids against the closed gate into solid plugs in the passageway and ejecting the plugs from said passageway to the exterior of the chamber when the gate is open, and said reciprocating means preventing loss of air pressure from the chamber when the gate is open.

3. A positive pressure continuous operating horizontal rotary drum filter which comprises a pressure tank having a removable end head, a horizontal rotary drum filter unit carried by said end head in said tank, means for securing said end head to the tank to provide an airtight chamber in the tank around said unit, means for maintaining the interior of the airtight chamber at a pressure from about 25-150 lbs. per square inch, said filter unit having a horizontal rotating drum with a filtering periphery and an interior discharging filtrate to the outside of said tank, a scraper for removing solids from the periphery of the drum, an open bottom trough in the tank collecting the solids from the scraper, a shroud moveable across the open bottom of the trough selectively covering the bottom of the trough to trap solids thereunder, a discharge passageway below the shroud receiving the trapped solids having an outlet adjacent the exterior of the end head, a valve controlling said outlet to selectively open and close the passageway, and a reciprocating plunger mechanism in said passageway effective to push the solids through the passageway against the valve to compact the solids between the valve and plunger into a plug, and means for advancing the plunger to discharge the plug from the outlet of the passageway.

4. A positive pressure continuous operating rotary drum filter which comprises a tank having an open end and a closed end, an end head detachably mounted on the open end of the trunk to cooperate therewith to form an airtight chamber, a rotary drum filter unit in said chamber carried by said end head, means for maintaining the airtight chamber under a positive pressure, said filter drum unit having a horizontal rotary drum with a filter periphery, an open top pan under the drum, means for maintaining a pond of slurry to be filtered in said pan at a level receiving a substantial portion of the periphery of the drum in the pond, means for rotating the drum through the pond, means discharging filtrate from the interior of the drum to the exterior of the tank, a scraper removing filtered solids from the drum periphery above that portion of the periphery immersed in the pond, an open bottom trough in the tank receiving solids from the scraper, a tube carried by the end head extending longitudinally from the end head to the closed end of the drum and having an open top slot along an intermediate portion thereof registering with the open bottom of the trough, a shroud slidable on said slotted tube to close and open said slot, a plunger slidable in the slotted tube, said end wall of the tank having an external tube extending therefrom, a piston slidable in said external tube, means for flowing fluid to and from both sides of the piston in the external tube to reciprocate the piston, a piston rod connecting said piston and plunger, latch mechanism releasably connecting the plunger and the shroud to drive the shroud on the slotted tube to close the slot for trapping solids from the trough in the tube in advance of the plunger, means for tripping said latching mechanism to free the shroud from the plunger when the shroud closes the slot, means on said latch mechanism reconnecting the plunger and shroud to open the slot when the plunger is retracted by the piston, gate valve mechanism receiving there against solids in the slotted tube being pushed by the advancing plunger, means for selectively opening said gate valve and continuing the pushing of the solids to sequentially discharge formed plugs of the solids from the tank, and means for retracting the tank from the end head to provide open access to the filter unit.

5. A positive pressure rotary drum filter which comprises a housing adapted to be closed to form an airtight chamber, a rotary drum filter unit in said chamber, said unit including a rotary filter drum with an air and liquid previous periphery, means for supplying material to be filtered to the periphery of the drum, means for removing solids from the drum periphery, means for draining filtrate from the drum interior, means for collecting removed solids from the drum periphery, means for pressurizing the chamber to maintain a high pressure differential across the periphery of the drum, a slotted discharge passage below said means for collecting removed solids from the drum periphery to receive said solids when the slot of the passageway is open, a shroud opening and closing the slot of the passageway for trapping solids in the passageway when the slot is closed, and a reciprocating plunger in the passageway for sequentially compacting solids trapped in the passageway to form plugs and removing the plugs from the chamber without venting the chamber.

6. The rotary drum filter of claim 5 including a discharge valve in said passageway cooperating with said plunger to compact the solids in the passageway before they are discharged.

7. The rotary drum filter of claim 1 wherein the housing is a horizontal tank with an open end and a closed end, and an end head seals said open end of the tank and carries the rotary drum filter unit, the passageway, the trapping means and the gate on a wheeled carriage riding on the bottom portion of the tank to support the filter unit and permit retraction of the tank from the end head to provide access to the rotary drum filter.

8. The rotary drum filter of claim 2 wherein the housing is a tank with an open end and a removable end head carrying said rotary drum filter unit.

9. The rotary drum filter of claim 3 wherein the pressure tank is mounted on first wheels, the filter unit carried by the end head in the tank is supported on second wheels riding in the tank, said first wheels permitting retraction of the tank from the end head said second wheels permitting the filter unit to remain fixed to the end head when the tank is retracted, and said first and second wheels cooperate to accommodate retraction of the tank from the end head for providing access to the filter unit.

10. The method of rotary drum filtering which comprises enclosing a rotary drum filter unit with a filtering periphery in an airtight chamber, maintaining a super atmospheric pressure in the chamber to develop a high pressure differential across the periphery of the drum to facilitate filtration, rotating the drum, feeding a slurry to the drum, filtering liquid from the slurry into the drum, depositing solids from the slurry on the drum, removing the solids from the drum, collecting the removed solids in the chamber, trapping the collected solids in an elongated passageway having an open discharge end, a gate opening and closing said end, and a plunger slidable therein, sequentially compacting the trapped solids in the chamber between the plunger an gate to form the solids into plugs, opening the gate after each plug is formed, advancing the plunger to successively discharge the plugs from the passageway through the open gate, and sealing the tank with the plunger when the gate is opened.

11. The method of rotary drum filtration which comprises encasing a rotary drum filter unit with a filtering periphery in a tank, feeding material to be filtered to the drum periphery, draining filtrate from the drum interior and the tank, scraping solids from the drum periphery into the tank, trapping the scrapped solids in an elongated passageway with an open discharge end and having a gate opening and closing said end and a plunger slidable therein, maintaining a super atmospheric pressure in the tank to develop a high pressure differential of about 25–150 pounds per square inch across the filtering periphery of the drum, activating the plunger to sequentially compact the trapped solids against the gate to form plugs in the passageway, opening the gate after each plug is formed, and successively discharging the plugs from the tank while sealing the tank with the plunger in the passageway.

12. The method of claim 11 including the step of feeding volatile material with a vaporizing point to the drum and maintaining the pressure in the tank above the vaporizing point of the volatile material.

* * * * *